United States Patent
Saito et al.

(10) Patent No.: US 11,505,857 B2
(45) Date of Patent: Nov. 22, 2022

(54) HIGH STRENGTH/HIGHLY CONDUCTIVE COPPER ALLOY PLATE MATERIAL AND MANUFACTURING METHOD THEREFOR

(71) Applicant: TANAKA KIKINZOKU KOGYO K. K., Tokyo (JP)

(72) Inventors: Yusuke Saito, Tomioka (JP); Takaomi Kishimoto, Tomioka (JP); Sigeyuki Nakano, Tomioka (JP)

(73) Assignee: TANAKA KIKINZOKU KOGYO K. K., Tokyo (JP)

( * ) Notice: Subject to any disclaimer, the term of this patent is extended or adjusted under 35 U.S.C. 154(b) by 193 days.

(21) Appl. No.: 16/652,127

(22) PCT Filed: Aug. 10, 2018

(86) PCT No.: PCT/JP2018/030132
§ 371 (c)(1),
(2) Date: Mar. 30, 2020

(87) PCT Pub. No.: WO2019/031612
PCT Pub. Date: Feb. 14, 2019

(65) Prior Publication Data
US 2021/0285080 A1    Sep. 16, 2021

(30) Foreign Application Priority Data
Aug. 10, 2017    (JP) ............... JP2017-156134

(51) Int. Cl.
*C22F 1/08* (2006.01)
*C22C 9/00* (2006.01)
*H01B 1/02* (2006.01)

(52) U.S. Cl.
CPC ............... *C22F 1/08* (2013.01); *C22C 9/00* (2013.01); *H01B 1/026* (2013.01)

(58) Field of Classification Search
CPC ............ H01B 1/02; H01B 1/026; C22C 9/00; C22F 1/08
See application file for complete search history.

(56) References Cited

U.S. PATENT DOCUMENTS

| 5,391,242 A | 2/1995 | Sakal et al. |
| 5,534,087 A | 7/1996 | Hirota et al. |

(Continued)

FOREIGN PATENT DOCUMENTS

| CN | 105839038 A |   | 8/2016 |
| EP | 3666914 A1 | * | 6/2020 |

(Continued)

OTHER PUBLICATIONS

English language machine translation of JP 2006-206988 (pub Aug. 2006).*

(Continued)

*Primary Examiner* — Mark Kopec
(74) *Attorney, Agent, or Firm* — Orrick, Harrington & Sutcliffe LLP; Joseph A. Calvaruso; K. Patrick Herman

(57) ABSTRACT

A high strength/highly conductive copper alloy plate material of the present invention contains silver in a range of 4% by mass or more and 13% by mass or less, and balancing copper and unavoidable impurities. In the high strength/highly conductive copper alloy plate material, a minimum value of a tensile strength (UTS) is 600 MPa or more and 1250 MPa or less, and a conductivity (% IACS) is 60% or more and 90% or less.

8 Claims, 2 Drawing Sheets

(56) References Cited

U.S. PATENT DOCUMENTS

| | | | |
|---|---|---|---|
| 6,800,151 | B1 | 10/2004 | Shima |
| 2002/0039542 | A1 | 4/2002 | Bogel et al. |
| 2005/0260438 | A1* | 11/2005 | Aoyagi .................. C22C 9/00 428/673 |
| 2020/0168355 | A1* | 5/2020 | Aoyama ............ H01B 11/1808 |
| 2021/0323060 | A1* | 10/2021 | Lecouturier .............. C22C 9/00 |

FOREIGN PATENT DOCUMENTS

| | | |
|---|---|---|
| JP | 6-192801 A | 7/1994 |
| JP | 6-192802 A | 7/1994 |
| JP | 2001-295010 A | 10/2001 |
| JP | 2005-344166 A | 12/2005 |
| JP | 2006-206988 A | 8/2006 |
| JP | 2006-219705 A | 8/2006 |

OTHER PUBLICATIONS

Sakai et al "New high-strength, high-conductivity Cu—Ag alloy sheets", Acta metall. mater. vol. 43, No. 4, pp. 1517-1522, 1995.*

Sakai et al "Ultra-high strength, high conductivity Cu—Ag alloy wires", Acta mater. vol. 45, No. 3, pp. 1017-1023, 1997.*

CN, Office Action for Chinese application No. 201880061145.9, dated Nov. 22, 2021.

PCT, International Search Report for PCT/JP2018/030132, dated Oct. 19, 2018.

TW, Office Action for Taiwanese application No. 107128042, dated Sep. 27, 2021.

EPO, Extended Search Report for European application No. 18843070.6, dated May 6, 2021.

Piyawit Waraporn et al: "Precipitation Behavior of Plastically Deformed CuAgZr Alloy", Physics Procedia, Elsevier, Amsterdam, NL, vol. 85, Dec. 10, 2016 (Dec. 10, 2016), pp. 36-40, XP029834623, ISSN: 1875-3892, DOI: 10.1016/J.PHPRO.2016.11.078.

Hamana Djamel et al: "Precipitation Kinetics and Mechanism in Cu-7 wt% Ag Alloy", Materials Sciences and Application, vol. 2, No. 7, Jan. 1, 2011 (Jan. 1, 2011), pp. 899-910, XP055798612, US ISSN: 2153-117X, DOI: 10.4236/msa.2011.27120.

KR, Office Action for Korean application No. 10-2020-7006728, dated Jul. 26, 2021.

EPO, Partial supplementary European search report for European application No. 18843070.6, dated Jan. 12, 2021.

Sakai et al., "New high-strength, high-conductivity Cu—Ag alloy sheets", ACTA Metallurgica & Materialien, Pergamon / Elsevier Science Ltd, Apr. 1, 1995 (Apr. 1, 1995), vol. 43, No. 4, pp. 1517-1522, GB.

JP, Office Action for Japanese application No. 2019-535731, dated Jun. 10, 2022.

CN, Office Action for Chinese application No. 201880061145.9, dated Apr. 26, 2022.

\* cited by examiner a continuation of prior International Application No. PCT/JP2018/030132, filed on Aug. 10, 2018 which is based upon and claims the benefit of priority from Japanese Patent Applications No. 2017-156134 filed on Aug. 10, 2017; the entire contents of all of which are incorporated herein by reference.

HIGH STRENGTH/HIGHLY CONDUCTIVE COPPER ALLOY PLATE MATERIAL AND MANUFACTURING METHOD THEREFOR

CROSS-REFERENCE TO RELATED APPLICATIONS

This application is a continuation of prior International Application No. PCT/JP2018/030132, filed on Aug. 10, 2018 which is based upon and claims the benefit of priority from Japanese Patent Applications No. 2017-156134 filed on Aug. 10, 2017; the entire contents of all of which are incorporated herein by reference.

FIELD

Embodiments described herein generally relate to a high strength/highly conductive copper alloy plate material and a manufacturing method therefor.

BACKGROUND

In the field of various electric/electronic industries, there is a demand for a conductive plate material as a conductive member having high strength and high conductivity. As such a conductive plate material, a copper alloy (Cu—Ag alloy) plate material containing silver has been developed. For example, in a water-cooled copper magnet, a Bitter plate is used as a conductive plate for generating a strong magnetic field, and a Bitter coil using the Bitter plate is adopted. The Bitter plate is required to have strength high enough to withstand enormous electromagnetic stress and water pressure upon water cooling, and conductivity that can suppress heat generation upon application of large current. The Cu—Ag alloy plate material has been applied to such a Bitter plate. However, a Cu—Ag alloy plate material satisfying both sufficient strength and conductivity has not been obtained and, thus, further increase in both the strength and conductivity of the Cu—Ag alloy plate material is required.

Further, in the field of electronic devices, functionality diversification, high integration, and miniaturization have been progressed and, along with this, a contact probe used for inspection of an electronic device is required to have a smaller size and higher density than ever before. In order to realize the smaller size and higher density of the contact probe, it is necessary to reduce the size and increase the density of the probe itself which is a conductive part, so that a material having high strength is required. Further, in order to suppress an increase in resistance due to a reduction in cross-sectional area of the conductive part as a result of the miniaturization and increase in density, a material having high conductivity is required. Further, in order to improve detection sensitivity, a material used for the probe is required to have high conductivity. Conventionally, as a probe material, a conductive material satisfying such strength and conductivity as described above has not yet been obtained.

A mobile device is required to be able to operate for a long time on a single charge, so that, in a rechargeable battery used for a mobile device, miniaturization and capacity increase have been progressed. Further, power consumption of a mobile device has increased due to increased speed and function diversification thereof, and thus the capacity increase of a rechargeable battery becomes more and more important. The increase in the capacity of a rechargeable battery takes more time in charging, so that rapid charging is required. In the rapid charging, a large amount of current is made to flow in a short period of time, so that it is necessary to reduce the resistance of a conductor or increase the cross-sectional area thereof. Since components cannot be increased in size due to miniaturization of a mobile device, there is a limitation in an increase in the cross-sectional area, and a connector is also required to use a material having high conductivity. Further, a connector is also required to have a reduced size along with the miniaturization of a mobile device, so that it is required to use a material having high strength as well as high conductivity. Conventionally, as a connector material, a conductive material satisfying such strength and conductivity as described above has not yet been obtained.

In a conventional composition of the Cu—Ag alloy plate material or manufacturing method therefor, a conductive material satisfying such strength and conductivity as described above has not yet been obtained. Further, there are proposed a manufacturing method for a Cu—Ag alloy wire having high strength and conductivity and a wire produced using the method. However, production of the Cu—Ag alloy plate material using the Cu—Ag alloy wire as a raw material is difficult in practice. That is, when the Cu—Ag alloy wire is rolled to produce a plate material, the rolling is carried out without back tension, so that the wire as a raw material may escape during rolling, generating weaving or undulation. This prevents the thickness of the plate material from being controlled and makes it likely to generate cracks or the like. Further, since it is difficult to control the thickness, processing rate differs from location to location, which may increase variation in strength or conductivity depending on location. This makes it difficult to achieve production of the plate material in practice. Further, a plate material having a large area and thickness cannot be produced and thus, this method cannot be applied particularly to the Bitter plate.

SUMMARY

A high strength/highly conductive copper alloy plate material according to an embodiment of the present invention contains silver in a range of 6% by mass or more and 13% by mass or less, and balancing copper and unavoidable impurities, and a minimum value of a tensile strength (UTS) is 1000 MPa or more and 1250 MPa or less, and a conductivity (% IACS) is 60% or more and 90% or less.

A high strength/highly conductive copper alloy plate material according to another embodiment of the present invention contains silver in a range of 4% by mass or more and 13% by mass or less, and balancing copper and unavoidable impurities, and a peak strength ratio of a (311) plane of silver is 20% or less in an X-ray diffraction chart of the copper alloy plate material.

A manufacturing method for a high strength/highly conductive copper alloy plate material according to an embodiment of the present invention, comprising: casting an alloy raw material containing silver in a range of 4% by mass or more and 13% by mass or less, and balancing copper and unavoidable impurities to obtain an ingot; cold rolling the ingot to obtain a first rolled material; applying solution treatment to the first rolled material at a temperature of 700° C. or more and less than 780° C. to obtain a solution-treated material; cold rolling the solution-treated material to obtain a second rolled material; applying aging treatment to the second rolled material by heating it at a temperature of 200° C. or more for 8 hours or more and 48 hours or less to obtain an aging-treated material; and cold rolling the aging-treated material to obtain a third rolled material as a copper alloy plate material.

Effect of the Invention

According to the present invention, there can be provided a high strength/highly conductive copper alloy plate material practically applicable to a conductive member requiring high strength and conductivity and a manufacturing method therefor.

DETAILED DESCRIPTION

Figure 1:
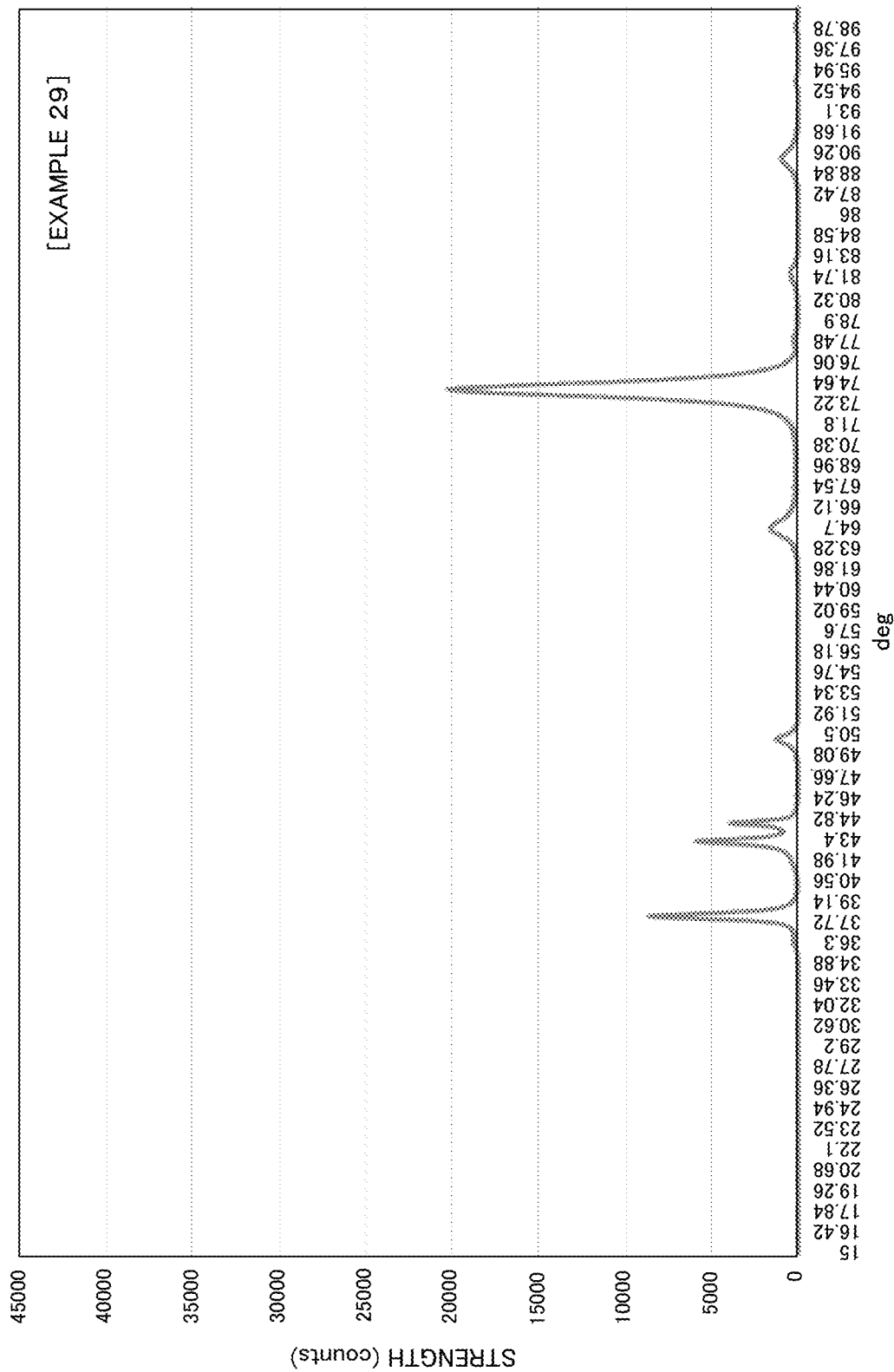
FIG. 1 is an X-ray diffraction profile of a copper alloy plate material of Example 29.

Hereinafter, embodiments for practicing a high strength/highly conductive copper alloy plate material according to the present invention and a manufacturing method therefor will be described.

First Embodiment

A high strength/highly conductive copper alloy plate material according to a first embodiment is a copper alloy (Cu—Ag alloy) plate material that contains silver (Ag) in a range of 6% by mass or more and 13% by mass or less, and balancing copper (Cu) and unavoidable impurities. When the content of Ag in the Cu—Ag alloy plate material is less than 6% by mass, an enhancing effect of strength by incorporation of Ag cannot be obtained. In order to enhance the strength of the Cu—Ag alloy plate material, the Ag content is preferably 8% by mass or more and, more preferably, 9% by mass or more. When the Ag content exceeds 13% by mass, processability is deteriorated to make it difficult to produce the Cu—Ag alloy plate material in practice. In order to enhance processability of the Cu—Ag alloy plate material, the Ag content is preferably 12% by mass or less and, more preferably, 11% by mass or less.

In the high strength/highly conductive copper alloy plate material according to the embodiment, the content of the unavoidable impurities other than Cu and Ag contained in the Cu—Ag alloy plate material is, although not particularly limited, preferably 0.1% by mass or less. When the content of the unavoidable impurities exceeds 0.1% by mass, the strength and conductivity of the Cu—Ag alloy plate material may be reduced. The content of the unavoidable impurities is more preferably 0.01% by mass or less. In some cases, the high strength/highly conductive copper alloy plate material according to the embodiment may contain a third element other than Cu and Ag in a range not impairing mechanical characteristics, electrical characteristics, metallographic characteristics, and the like. Examples of the third element include gold (Au), aluminum (Al), bismuth (Bi), Manganese (Mn), antimony (Sb), magnesium (Mg), and samarium (Sm).

The high strength/highly conductive Cu—Ag alloy plate material according to the embodiment has a tensile strength (UTS) of 1000 MPa or more and 1250 MPa or less and a conductivity (% IACS) of 60% or more and 90% or less. The tensile strength (UTS) in the present specification refers to the minimum value thereof. Using such a Cu—Ag alloy plate material satisfying both high strength and high conductivity, it is possible to provide a conductive material (plate material) suitable for a Bitter plate (conductive plate) used in a water-cooled copper magnet, a probe material for a contact probe, a connector material for a mobile device, and the like. That is, when the tensile strength (UTS) of the Cu—Ag alloy plate material is 1000 MPa or more and the conductivity (% IACS) thereof is 60% or more, it is possible to enhance the conductivity of a conductive member (plate member) while satisfying the strength required for the conductive member. In the Cu—Ag alloy plate material containing Ag in the range of 6% by mass to 13% by mass, a tensile strength (UTS) exceeding 1250 MPa or a conductivity (% IACS) exceeding 90% is not practical. If such a value could be realized, it is difficult to maintain the shape of the plate material or processability of the plate material.

For example, when the high strength/highly conductive Cu—Ag alloy plate material according to the embodiment is applied to a Bitter plate of a water-cooled copper magnet, it is possible to suppress heat generation upon application of large current as well as to withstand huge electromagnetic stress and water pressure upon water cooling. Further, the Cu—Ag alloy plate material is also suitably used as a probe material for a contact probe and a connector material for a mobile device. When the high strength/highly conductive Cu—Ag alloy plate material according to the embodiment is used as a probe material for a contact probe, it is possible not only to satisfy strength high enough to realize miniaturization and increase in density of the probe but also to suppress an increase in resistance even when the cross-sectional area of the probe is reduced as a result of the miniaturization and increase in density. Further, when the high strength/highly conductive Cu—Ag alloy plate material according to the embodiment is used as a connector material for a mobile device, it is possible not only to make a large amount of current allowing rapid charging to flow in a short time period but also to realize miniaturization while maintaining the shape and function of the connector so as to allow miniaturization of the mobile device.

When the Cu—Ag alloy plate material is produced in a production process including rolling and heat treatment to be described later, the tensile strength (UTS) typically differs depending on a pressure application direction in the rolling process included in the plate material production process, i.e., a rolling direction and a direction (direction 90° to the rolling direction) perpendicular to the rolling direction. The rolling direction refers to a direction perpendicular to the axial direction of a work roll of a rolling mill, and the direction perpendicular to the rolling direction refers to the axial direction of a work roll of a rolling mill. The high strength/highly conductive Cu—Ag alloy plate material according to the embodiment satisfies a tensile strength (UTS) of 1000 MPa or more in both the rolling direction and the direction perpendicular to the rolling direction.

Further, in the high strength/highly conductive Cu—Ag alloy plate material according to the embodiment, the minimum value of the tensile strength (UTS) in the rolling direction satisfies 1000 MPa or more and 1150 MPa or less, and the minimum value of the tensile strength (UTS) in the direction perpendicular to the rolling direction satisfies 1150 MPa or more and 1250 MPa or less. In a conventional Cu—Ag alloy plate material, the tensile strength in the rolling direction is low, while in the high strength/highly conductive Cu—Ag alloy plate material according to the embodiment, also the tensile strength (UTS) in the rolling direction satisfies 1000 MPa or more and 1150 MPa or less. Even when a conductive member using the Cu—Ag alloy plate material according to the embodiment is applied with stress or pressure from various directions, it can withstand such stress or pressure. This allows the practicality of the Cu—Ag alloy plate material to be enhanced significantly.

The tensile strength (UTS) specified in the present specification is a stress value in a state where a maximum load is applied in a tensile test, which indicates an ultimate tensile strength. Specifically, the tensile strength (UTS) specified in the present specification is a strength (unit: MPa) at a time point when a maximum load is applied in the course of applying a load until fracture occurs in the tensile test wherein a test piece (standard test piece) having a width of 10 mm, a thickness of 0.2 mm, and a length of 200 mm is basically used, and a head speed is set to 100 mm/min. However, the size of the test piece is not limited to this, and the test piece only needs to have a size capable of being clamped under use conditions of a tensile tester. For example, the test piece may have a 2 mm width, 0.2 mm thickness, and 10 mm length. When test pieces have a size allowed to be used in the tensile tester, measurement values (the tensile strength (UTS)) thereof are substantially the same. The value of the tensile strength (UTS) in the rolling direction and the value of the tensile strength (UTS) in the direction perpendicular to the rolling direction are each obtained as follows: test pieces are collected from three or more portions of a sample and subjected to the tensile test, and the minimum value of obtained measurement values is adopted. In place of collecting the test pieces from three or more portions of one sample, three or more arbitrary test pieces may be prepared for the tensile test. When the direction upon rolling is not specified, the value of the tensile strength (UTS) is the minimum value of measurement values obtained from three or more test pieces prepared regardless of the rolling direction. When the rolling direction cannot be specified, the direction can be estimated by considering the magnitude of measurement values of the tensile strength (UTS) in one direction of the sample and in a direction perpendicular thereto.

The high strength/highly conductive Cu—Ag alloy plate material according to the embodiment has a conductivity (% IACS) of 60% or more and 90% or less. The conductivity (% IACS) of the Cu—Ag alloy plate material according to the embodiment is preferably 64% or more and 75% or less, more preferably, 66% or more and 75% or less, and particularly preferably, 70% or more and 75% or less. The conductivity (% IACS) is a relative value (unit: %) when the conductivity of annealed standard soft copper (volume resistivity: $1.7241\times10^{-2}$ μΩm) internationally adopted as a standard for indicating electrical conductivity based on IACS (International Annealed Copper Standard) is 100%. The value of the conductivity (% IACS) in the embodiment is obtained as follows: test pieces are collected from three or more portions of a sample, the conductivity of each of the test pieces is measured by four-terminal method, conversion values (% IACS) are calculated from the conductivity measurement values based on the above-mentioned conversion method, and the average value of the conversion values is adopted. In place of collecting the test pieces from three or more portions of one sample, three or more arbitrary test pieces may be prepared for the conductivity measurement.

In the high strength/highly conductive Cu—Ag alloy plate material according to the embodiment, the plate material refers to a member in which the ratio (W/T) of the width (W) to the thickness (T) of the cross section is 1.25 or more when observing the cross section. In this case, the thickness (T) is preferably 0.01 mm to 0.8 mm, and the width (W) is preferably 0.2 mm to 500 mm. The W/T in the cross section of the plate material is preferably 2 or more, and in this case, the thickness (T) is preferably 0.01 mm to 0.8 mm, and the width (W) is preferably 0.2 mm to 500 mm. Further, the W/T ratio in the cross section of the plate material is preferably 5 or more, and in this case, the thickness (T) is preferably 0.1 mm to 0.8 mm, and the width (W) is preferably 5 mm to 500 mm. Furthermore, the W/T ratio in the cross section of the plate material is more preferably 10 or more, and in this case, the thickness (T) is preferably 0.1 mm to 0.5 mm, and the width (W) is preferably 5 mm to 500 mm. The width (W) in the cross section of the plate material is more preferably 5 mm to 300 mm. In other words, according to the embodiment, it is possible to practically provide a Cu—Ag alloy plate material having the above-described cross-sectional shape, tensile strength (UTS), and conductivity (% IACS). The plate material preferably has a rectangular cross section, but not limited thereto. For example, the plate material may have an irregular cross section such as an elliptical cross section or step-like cross section. In such a case, a member in which the ratio of the width to the maximum thickness is 1.25 or more is defined as the plate material.

The high strength/highly conductive Cu—Ag alloy plate material satisfying the above tensile strength (UTS) and conductivity (% IACS) can be obtained by adopting a Cu—Ag alloy plate material manufacturing method to be described later. According to the Cu—Ag alloy plate material manufacturing method, a fibrous structure in which fiber (hereinafter, referred to as "Ag fiber") containing Ag in a Cu—Ag solid solution exists can be obtained. The Ag fiber contains a eutectic phase of Cu and Ag. In such a fibrous structure, (1) the crystal plane of Ag in X-ray diffraction (XRD) is controlled and/or (2) the shape and abundance of the Ag fiber is controlled, whereby it is possible to enhance both the strength and conductivity of the Cu—Ag alloy plate material, for example, to satisfy a tensile strength (UTS) of 1000 MPa or more and 1250 MPa or less and a conductivity (% IACS) of 60% or more and 90% or less.

As for (1), when a diffraction peak of an Ag (220) plane exists in an XRD diffraction chart of the Cu—Ag alloy plate material having the fibrous structure, and the peak strength ratio of the Ag (220) plane is 80% or more, it is possible to satisfy both the above-described tensile strength (UTS) and conductivity (% IACS) with good reproducibility. The fact that the peak strength ratio of the Ag (220) plane is 80% or more means that the Ag fiber exists in the Cu—Ag alloy plate material in an adequate shape and amount, whereby both the strength and conductivity of the Cu—Ag alloy plate material are enhanced. On the other hand, the peak strength ratio of an Ag (111) plane exceeds 20%, the abundance of the Ag fiber, particularly, abundance of a thick Ag fiber to be described later becomes excessive, which not only reduces both the strength and conductivity of the Cu—Ag alloy plate material but also deteriorates processability of the Cu—Ag alloy plate material. When the diffraction peak of the Ag (220) plane is 80% or more, and the peak strength ratio of the Ag (111) plane is 20% or less, it is possible to enhance both the strength and conductivity of the Cu—Ag alloy plate material.

The above peak strength ratio of the Ag (220) plane and the peak strength ratio of the Ag (111) plane are measured and determined as follows. That is, X-ray is irradiated onto a sample of the Cu—Ag alloy plate material by a focused beam method to detect a diffraction peak by a 2θ-θ method. The phase of the diffraction peak is identified, and the strengths of the Ag and Cu are obtained. Thereafter, the peak strength of each crystal surface is converted to a percentage to obtain the strength ratio. The X-ray diffraction by the 2θ-θ method is carried out using a test piece having, e.g., a 10 mm width, a 0.2 mm thickness, and a 10 mm length. However, the size of the test piece is not limited to this, and the test piece only needs to have a size capable of being installed in an X-ray diffraction apparatus. For example, the test piece may have a 2 mm width, 0.2 mm thickness, and 10 mm length.

As for (2), when the Cu—Ag alloy plate material has a fibrous structure containing the Ag fibers, the Ag fibers contribute to enhancement of the strength of the Cu—Ag alloy plate material. The Ag fibers also contribute to enhancement of the conductivity of the Cu—Ag alloy plate material depending on the shape or abundance thereof. In the fibrous structure containing the Ag fibers, an adequate amount of thin Ag fibers preferably exists. Specifically, the thin Ag fibers preferably exist such that the concentration (C1) of the thin Ag fibers in the fibrous structure is 4% or more and 7% or less in area ratio. When the concentration of the thin Ag fibers is 4% or more in area ratio, the strength of the Cu—Ag alloy plate material can be enhanced. When the concentration of the thin Ag fibers exceeds 7% in area ratio, the conductivity of the Cu—Ag alloy plate material tends to decrease. The concentration (C1) of the thin Ag fibers is more preferably 5% or more and 7% or less in area ratio.

Further, the fibrous structure containing the Ag fibers preferably has thick Ag fibers in addition to the above-described thin Ag fibers. The thick Ag fibers preferably exist such that the concentration (C2) of the thick Ag fibers is 3% or more and 6% or less in area ratio. In addition, in the fibrous structure containing the Ag fibers, the thin Ag fibers and thick Ag fibers preferably exist such that the ratio (C1/C2) of the concentration (C1) of the thin Ag fibers in area ratio to the concentration (C2) of the thick Ag fibers in area ratio is 0.9 or more. The thick Ag fibers contribute to enhancement of the strength of the Cu—Ag alloy plate material and also to conductivity thereof since they themselves serve as reinforcement for the conductivity.

When the ratio of the concentration of the thick Ag fibers in area ratio is 3% or more, both the strength and conductivity of the Cu—Ag alloy plate material can be enhanced. However, when the ratio of the concentration of the thick Ag fibers in area ratio exceeds 6% or when the ratio (C1/C2) of the Ag fibers in area ratio is less than 0.9, that is, when the abundance of the thick Ag fibers becomes excessive, the strength and conductivity of the Cu—Ag alloy plate material tend to decrease. The ratio (C1/C2) of the concentration of the Ag fibers in area ratio is preferably 2 or less. When the ratio (C1/C2) of the concentration of the Ag fibers in area ratio exceeds 2, that is, when the relative abundance of the thick Ag fibers decreases, an effect of enhancing the strength and conductivity of the Cu—Ag alloy plate material may become insufficient. The ratio of the concentration of the thick Ag fibers in area ratio is more preferably 4% or more and 5.5% or less. Further, the ratio (C1/C2) of the Ag fibers in area ratio is more preferably 1 or more and 1.5 or less.

The thin Ag fiber refers to a fibrous structure whose fiber diameter is stretched to 0.1 nm or more and 1.0 nm or less. The thick Ag fiber refers to a fibrous structure whose fiber diameter is stretched to 1 μm or more and 10 μm or less. Observation of the thin and thick Ag fibers and measurement of the ratio (unit: %) of the concentration of the Ag fibers in area ratio are carried out as follows. That is, a 5-mm square sample is cut out from the Cu—Ag alloy plate material using a High Cutter and subjected to polishing by a water-resistant abrasive paper (#2000), and then subjected to cross-section polishing using an ion milling method, followed by observation using a field emission-type scanning electron microscope (FE-SEM). The observation is performed in a COMPO (composition) image mode with acceleration voltage of 5 kV and magnification of ×60000. Then, the fiber diameter is measured based on the observed image to specify the Ag fiber, and the area ratios are compared with the observation image binarized with a threshold value of 10000. The fiber diameter of the Ag fiber refers to a thickness in the above cross-section observation and may have a width in the depth direction. The shape of the Ag fiber is not limited to a fibrous one, and may be plate-like and has a certain degree of width. The above-mentioned ratio between the width and thickness of the plate material relates to the alloy plate and does not apply to the shape of the Ag fiber.

Second Embodiment

The following describes a high strength/highly conductive copper alloy plate material according to a second embodiment. The high strength/highly conductive copper alloy plate material according to the second embodiment is a copper alloy (Cu—Ag alloy) plate material that contains silver (Ag) in the range of 4% by mass or more and 13% by mass or less, and balancing copper (Cu) and unavoidable impurities. When the content of Ag in the Cu—Ag alloy plate material according to the second embodiment is less than 4% by mass, an enhancing effect of the strength by incorporation of Ag cannot be sufficiently obtained. In order to enhance the strength of the Cu—Ag alloy plate material, the Ag content is preferably 6% by mass or more, more preferably, 8% by mass or more and, particularly preferably, 9% by mass or more. When the Ag content exceeds 13% by mass, processability is deteriorated to make it difficult to produce the Cu—Ag alloy plate material in practice. In order to enhance processability of the Cu—Ag alloy plate material, the Ag content is preferably 12% by mass or less and, more preferably, 11% by mass or less. The content of the unavoidable impurities, the shape of the plate material, measurement methods for various characteristics in the high strength/highly conductive Cu—Ag alloy plate material according to the second embodiment, are the same as those in the high strength/highly conductive Cu—Ag alloy plate material according to the first embodiment, and the reasons for specifying them are also the same as those in the first embodiment. The Cu—Ag alloy plate material according to the second embodiment has basically the same configuration as that of the first embodiment except for the configuration specifically described below.

The high strength/highly conductive Cu—Ag alloy plate material according to the second embodiment is featured in that, in the X-ray diffraction (XRD), the peak strength ratio of the Ag (311) plane is 20% or less. It is found that the Ag (311) plane is a crystal plane contributing to a reduction in the strength of the Cu—Ag alloy plate material. By controlling the peak strength ratio of the Ag (311) plane to 20% or less, it is possible to enhance the strength of the Cu—Ag alloy plate material containing Ag in the range of 4% by mass to 13% by mass. Further, as for the conductivity of the Cu—Ag alloy plate material, when the Cu—Ag alloy plate material contains Ag in the range of 4% by mass to 13% by mass, high conductivity can be obtained. The peak strength ratio of the Ag (311) plane is preferably 15% or less, more preferably, 10% or less and, particularly preferably, substantially 0%. In the X-ray diffraction of the Cu—Ag alloy plate material, the peak other than that of the (311) plane includes those of the above-described (220) and (111) planes, but not limited thereto.

The above peak strength ratio of the Ag (311) plane is measured and determined in the manner as described above. That is, X-ray is irradiated onto a sample of the Cu—Ag alloy plate material by a focused beam method to detect a diffraction peak by a 2θ-θ method. The phase of the diffraction peak is identified, and the strength of the Ag and Cu is obtained. Thereafter, the peak strength of each crystal surface is converted to a percentage to obtain the strength ratio. The X-ray diffraction by the 2θ-θ method is carried out using a test piece having, e.g., a 10 mm width, a 0.2 mm thickness, and a 10 mm length. However, the size of the test piece is not limited to this, and the test piece only needs to have a size capable of being installed in an X-ray diffraction apparatus. For example, the test piece may have a size of 2 mm width, 0.2 mm thickness, and 10 mm length to carry out the X-ray diffraction.

As described above, when the peak strength ratio of the Ag (311) plane is 20% or less in the XRD diffraction chart of the Cu—Ag alloy plate material, it is possible to enhance the tensile strength (UTS) of the Cu—Ag alloy plate material without impairing the conductivity based on a Cu—Ag alloy composition containing Ag in the range of 4% by mass to 13% by mass. Specifically, there can be provided a Cu—Ag alloy plate material satisfying a tensile strength (UTS) of 600 MPa or more and 1250 MPa or less and a conductivity (% IACS) of 60% or more and 90% or less. In other words, when the peak strength ratio of the Ag (311) plane in the XRD exceeds 20%, the tensile strength (UTS) is reduced to less than 600 MPa, failing to satisfy the function as the high strength/highly conductive Cu—Ag alloy plate material.

Using such a Cu—Ag alloy plate material satisfying both high strength and high conductivity, it is possible to provide a conductive material (plate material) suitable for the above-mentioned Bitter plate (conductive plate) used in a water-cooled copper magnet, probe material for a contact probe, connector material for a mobile device, and the like. For example, a Cu—Ag alloy plate material having a tensile strength (UTS) of 600 MPa or more and 1000 MPa or less can be applied to a probe material for a contact probe. That is, when the tensile strength (UTS) is 600 MPa or more, it is possible not only to satisfy strength applicable to the probe material for a contact probe but also to suppress an increase in resistance even when the cross-sectional area of the probe is reduced. Further, as in the first embodiment, the tensile strength (UTS) of the Cu—Ag alloy plate material can be set to 1000 MPa or more and 1250 MPa or less. When the Cu—Ag alloy plate material having such a tensile strength (UTS) is applied to a Bitter plate of a water-cooled copper magnet as in the first embodiment, it is possible to suppress heat generation upon application of large current as well as to withstand enormous electromagnetic stress and water pressure upon water cooling. Further, when such a Cu—Ag alloy plate material is used as a probe material for a contact probe or a connector material, it is possible to suppress an increase in resistance and achieve rapid charging while satisfying practical strength, shape, and the like.

As described above, when the Cu—Ag alloy plate material is produced in a production process including rolling and heat treatment to be described later, the tensile strength (UTS) typically differs depending on a pressure application direction in the rolling process included in the plate material production process, i.e., a rolling direction and a direction (direction 90° to the rolling direction) perpendicular to the rolling direction. The high strength/highly conductive Cu—Ag alloy plate material according to the second embodiment satisfies a tensile strength (UTS) of 600 MPa or more in both the rolling direction and the direction perpendicular to the rolling direction. Further, in the high strength/highly conductive Cu—Ag alloy plate material according to the second embodiment, the minimum value of the tensile strength (UTS) in the rolling direction satisfies 600 MPa or more and 1150 MPa or less, and the minimum value of the tensile strength (UTS) in the direction perpendicular to the rolling direction satisfies 700 MPa or more and 1250 MPa or less. In a conventional Cu—Ag alloy plate material, the tensile strength in the rolling direction is low, while in the high strength/highly conductive Cu—Ag alloy plate material according to the embodiment, also the tensile strength (UTS) in the rolling direction satisfies 600 MPa or more and 1150 MPa or less. Therefore, even when a conductive member using the Cu—Ag alloy plate material according to the embodiment is applied with stress or pressure from various directions, it can withstand such stress or pressure.

In the high strength/highly conductive Cu—Ag alloy plate material according to the second embodiment, the tensile strength (UTS) is a stress value in a state where a maximum load is applied in a tensile test, which indicates an ultimate tensile strength (UTS). Specifically, the tensile strength (UTS) is a strength (unit: MPa) at a time point when a maximum load is applied in the course of applying a load until fracture occurs in the tensile test wherein a test piece (standard test piece) having a 10 mm width, a 0.2 mm thickness, and a 200 mm length is basically used, and a head speed is set to 100 mm/min. However, the size of the test piece is not limited to this and, for example, the test piece may have a size of 2 mm width, 0.2 mm thickness, and 10 mm length. The value of the tensile strength (UTS) in the rolling direction and the value of the tensile strength (UTS) in the direction perpendicular to the rolling direction are each obtained as follows: test pieces are collected from three or more portions of a sample and subjected to the tensile test, and the minimum value of obtained measurement values is adopted. In place of collecting the test pieces from three or more portions of one sample, three or more arbitrary test pieces may be prepared for the tensile test. When the direction upon rolling is not specified, the value of the tensile strength (UTS) is the minimum value of measurement values obtained from three or more test pieces prepared regardless of the rolling direction. When the rolling direction cannot be specified, the direction can be estimated by considering the magnitude of measurement values of the tensile strength (UTS) in one direction of the sample and in a direction perpendicular thereto.

In the high strength/highly conductive Cu—Ag alloy plate material according to the second embodiment, the conductivity (% IACS) is, as described above, a relative value (unit: %) when the conductivity of annealed standard soft copper internationally adopted as a standard for indicating electrical conductivity based on IACS is 100%. The value of the conductivity (% IACS) in the second embodiment is obtained as follows: test pieces are collected from three or more portions of a sample, the conductivity of each of the test pieces is measured by four-terminal method, conversion values (% IACS) are calculated from the conductivity measurement values based on the above-mentioned conversion method, and the average value of the conversion values is adopted. In place of collecting the test pieces from three or more portions of one sample, three or more arbitrary test pieces may be prepared for the conductivity measurement.

Third Embodiment

The following describes a manufacturing method for the high strength/highly conductive copper alloy plate material according to the embodiments. The high strength/highly conductive copper alloy plate material according to the embodiments can be obtained by the following manufacturing method, but not limited thereto. The manufacturing method for the high strength/highly conductive copper alloy plate material according to the embodiments includes the steps of: casting an alloy raw material containing Ag in the range of 4% by mass or more and 13% by mass or less, and balancing copper and unavoidable impurities to obtain an ingot; cold rolling the ingot to obtain a first rolled material; applying solution treatment to the first rolled material at a temperature of 700° C. or more and less than 780° C. to obtain a solution-treated material; cold rolling the solution-treated material to obtain a second rolled material; applying aging treatment to the second rolled material by heating it at a temperature of 200° C. or more for 8 hours or more and 48 hours or less to obtain an aging-treated material; and cold rolling the aging-treated material to obtain a third rolled material as a copper alloy plate material. The heat treatment temperature is an electric furnace set temperature (the same applies hereinafter).

In the manufacturing method for the copper alloy plate material according to the embodiments, the step of casting an alloy raw material is preferably carried out by, but not limited thereto, dissolving an alloy material containing Ag in the range of 4% by mass or more and 13% by mass or less, and balancing Cu and unavoidable impurities in a graphite crucible under a vacuum atmosphere or an inert atmosphere, or dissolving the alloy material in a graphite crucible using an atmospheric melting furnace while blowing inert gas onto the molten metal surface, and then by casting the resultant material into a graphite mold or a cast-iron mold. Surface defects on the outer peripheral surface of the casted Cu—Ag alloy ingot are preferably removed by grinding. The content of the unavoidable impurities in the Cu—Ag alloy ingot is preferably 0.1% by mass or less and, more preferably, 0.01% by mass or less. When the copper alloy plate material according to the first embodiment is produced, an alloy raw material containing Ag in the range of 6% by mass or more and 13% by mass or less with the remainder being composed of Cu and unavoidable impurities is used.

Subsequently, a first cold rolling step of cold rolling the Cu—Ag alloy ingot to obtain a first rolled material is performed. The first cold rolling step is performed for fracturing crystal grains or crystal grain boundaries generated upon casting to enhance the effect of solution treatment to be performed subsequently. A processing rate in the thickness direction in the first cold rolling step is preferably 5% or more and 20% or less. When the processing rate in the first cold rolling step is less than 5%, the crystal grains or crystal grain boundaries generated upon casting cannot be sufficiently fractured. When the processing rate in the first cold rolling step exceeds 20%, a sufficient plate thickness of a product cannot be achieved, making it difficult to produce a plate material for industrial applications. The processing rate in the thickness direction in the cold cooling step is a value calculated by "(A−B)/A×100 (%)", where A is the thickness of a material before processing, and B is the thickness after processing. The same applies to the processing rate in the subsequent second and third cold rolling steps.

Subsequently, a solution treatment step of applying solution treatment to the first rolled material to obtain a solution-treated material is performed. The solution treatment step is a process of obtaining a supersaturated solid solution (Cu—Ag solid solution) by dissolving Ag in Cu. The solution treatment step is performed at a temperature around or equal to or less than the solidus line of the Cu—Ag composition of the alloy material. For 4% by mass to 13% by mass Ag-Cu composition, the solution treatment temperature is preferably set in the range of 700° C. to 780° C. and, more preferably, in the range of 740° C. to 770° C. A holding time (solution treatment time) at such a temperature is preferably 2 hours to 5 hours. After heat treatment for the solution treatment, a supersaturated solid solution structure is preferably quenched and maintained until it reaches room temperature. Quenching is preferably performed after the solution treatment, and the quenching rate at this time is preferably set to −700° C./min or more.

Subsequently, a second cold rolling step of cold rolling the solution-treated material after quenching to obtain a second rolled material is performed. The second cold rolling step is performed to promote grain boundary reaction type precipitation upon aging treatment by applying strain to the crystal grain boundaries. A processing rate in the thickness direction in the second cold rolling step is preferably 20% or more and 99% or less. When the processing rate in the second cold rolling step is less than 20%, the grain boundary reaction type precipitation upon aging treatment cannot be promoted by the strain application to the crystal grain boundaries. When the processing rate in the second cold rolling step exceeds 99%, a plate thickness of a product cannot be achieved, making it difficult to produce a plate material for industrial applications. In order to adequately control the fibrous structure containing the Ag fibers in the plate material, the processing rate in the second cold rolling step is more preferably set to 40% or less.

Subsequently, an aging treatment step of applying aging treatment to the second rolled material to obtain an aging-treated material is executed. The aging treatment is a process of precipitating Cu crystal grains (crystal grains of the Cu—Ag solid solution) from the Cu—Ag supersaturated solid solution. In some case, it is preferable to precipitate the Ag fibers in the Cu crystal grains by the aging treatment. After the aging treatment, furnace cooling is preferably performed. The aging treatment step is preferably performed while maintaining a comparatively low temperature for a long time. Specifically, a temperature of 200° C. or more is preferably maintained for 8 hours or more and 48 hours or less. This allows the Cu—Ag alloy containing Ag in the range of 4% by mass to 13% by mass to have an adequate recrystallized structure. Further, depending on conditions, Ag fibers having an adequate amount and shape can be precipitated. Further, in a Cu—Ag alloy containing Ag in the range of 8% by mass to 12% by mass, it is possible to precipitate Ag fibers from which thick fibers are derived in addition to Ag fibers from which thin Ag fibers are derived.

When the aging treatment temperature is less than 200° C., the crystal plane of the Cu—Ag alloy may not be brought to an appropriate state, or a sufficient amount of the thick Ag fibers may not be precipitated. The aging treatment temperature is preferably 450° C. or less and, more preferably, 410° C. or less. Even when the aging treatment time exceeds 48 hours, the crystal plane of the Cu—Ag alloy may not be brought to an appropriate state. However, when the aging treatment temperature exceeds 450° C., an adequate amount of the Ag fibers may not be obtained, which may reduce the strength. Further, when the aging treatment time exceeds 48 hours, an effect of precipitating an adequate amount of the Ag fibers cannot be obtained. The aging treatment temperature is more preferably 350° C. or more and 450° C. or less, and the aging treatment time is more preferably 12 hours or more and 24 hours or less. Further, preferably, the lower the temperature in the above temperature range is, the longer the aging treatment time.

Thereafter, a third cold rolling step of cold rolling the aging-treated material to obtain a third rolled material is performed. The third cold rolling step is a process of extending a crystal structure generated by the aging treatment in the rolling direction to bring the crystal plane of the Cu—Ag alloy to an appropriate state and rolling the aging-treated material up to a thickness required for a plate material. Further, by extending the Ag fibers precipitated during the aging treatment and precipitates from which the Ag fibers are derived in the rolling direction, it is possible to obtain Ag fibers having an adequate fiber diameter. Particularly, in the Cu—Ag alloy containing Ag in the range of 8% by mass to 12% by mass, it is possible to obtain a structure in which the thin Ag fibers and thick Ag fibers exist in an adequate amount. A processing rate in the thickness direction in the third cold rolling step is preferably 90% or more. When the processing rate in the third cold rolling step is less than 90%, the crystal plane of the Cu—Ag alloy may not be brought to an appropriate state, or a sufficient amount of Ag fibers having an adequate fiber diameter may not be obtained. Further, a structure in which the thin Ag fibers and thick Ag fibers exist in an adequate amount may not be obtained. The processing rate in the third cold rolling step is more preferably 95% or more.

The third rolled material obtained by the third cold rolling step is used as the high strength/highly conductive copper alloy plate material according to the embodiments. Depending on manufacturing conditions in the above-described manufacturing method, a high strength/highly conductive copper alloy plate material having a tensile strength (UTS) of 1000 MPa or more and 1250 MPa or less and a conductivity (% IACS) of 60% or more and 90% or less can be obtained. Further, depending on manufacturing conditions, a high strength/highly conductive copper alloy plate material in which the peak strength ratio of the Ag (311) plane in the XRD diffraction chart is 20% or less can be obtained. Using such a high strength/highly conductive copper alloy plate material, it is possible to provide a conductive material (plate material) suitable for a Bitter plate used in a water-cooled copper magnet, and a probe material for a contact probe and a connector material for a mobile device which are currently miniaturized and increased in density.

EXAMPLES

The following describes specific examples of the present invention and evaluation results thereof.

Example 1

An alloy raw material containing 6% by mass of Ag with the remainder being composed of Cu and unavoidable impurities was put in a graphite crucible and dissolved. The resultant molten Cu—Ag alloy was casted into a graphite mold to produce a Cu—Ag alloy ingot. The surface of the Cu—Ag alloy was ground and removed to produce a Cu—Ag alloy billet having a size of 200 mm width, 230 mm length, and 50 mm thickness. Then, the obtained Cu—Ag alloy billet was cold rolled (processing rate: 20%) to a thickness of 40 mm to obtain a first rolled material. The first rolled material was then maintained at a temperature of 760° C. for 2 hours for solution treatment to thereby obtain a solution-treated material. After the solution treatment, the solution-treated material was quenched at a quenching rate of −700° C./min. Then, the solution-treated material having a 40 mm thickness was cold rolled (processing rate: 30%) to a thickness of 28 mm to obtain a second rolled material. The second rolled material was maintained at a temperature of 410° C. for 20 hours for aging treatment to thereby obtain an aging-treated material. After the aging treatment, the aging-treated material was quenched. Thereafter, the aging-treated material having a thickness of 28 mm was cold rolled (processing rate: 99%) to a thickness of 0.28 mm to thereby obtain a third rolled material as an intended Cu—Ag alloy plate material. The obtained Cu—Ag alloy plate material was subjected to characteristic evaluation to be described later.

Example 2

An alloy raw material containing 8% by mass of Ag with the remainder being composed of Cu and unavoidable impurities was put in a graphite crucible and dissolved. The resultant molten Cu—Ag alloy was casted into a graphite mold to produce a Cu—Ag alloy ingot. The surface of the Cu—Ag alloy was ground and removed to produce a Cu—Ag alloy billet having a size of 200 mm width, 230 mm length, and 50 mm thickness. Then, the obtained Cu—Ag alloy billet was cold rolled (processing rate: 20%) to a thickness of 40 mm to obtain a first rolled material. The first rolled material was then maintained at a temperature of 760° C. for 2 hours for solution treatment to thereby obtain a solution-treated material. After the solution treatment, the solution-treated material was quenched at a quenching rate of −700° C./min. Then, the solution-treated material having a 40 mm thickness was cold rolled (processing rate: 30%) to a thickness of 28 mm to obtain a second rolled material. The second rolled material was maintained at a temperature of 410° C. for 20 hours for aging treatment to thereby obtain an aging-treated material. After the aging treatment, the aging-treated material was quenched. Thereafter, the aging-treated material having a thickness of 28 mm was cold rolled (processing rate: 99%) to a thickness of 0.28 mm to thereby obtain a third rolled material as an intended Cu—Ag alloy plate material. The obtained Cu—Ag alloy plate material was subjected to characteristic evaluation to be described later.

Example 3

An alloy raw material containing 10% by mass of Ag with the remainder being composed of Cu and unavoidable impurities was put in a graphite crucible and dissolved. The resultant molten Cu—Ag alloy was casted into a graphite mold to produce a Cu—Ag alloy ingot. The surface of the Cu—Ag alloy was ground and removed to produce a Cu—Ag alloy billet having a size of 200 mm width, 230 mm length, and 50 mm thickness. Then, the obtained Cu—Ag alloy billet was cold rolled (processing rate: 20%) to a thickness of 40 mm to obtain a first rolled material. The first rolled material was then maintained at a temperature of 760° C. for 2 hours for solution treatment to thereby obtain a solution-treated material. After the solution treatment, the solution-treated material was quenched at a quenching rate of −700° C./min. Then, the solution-treated material having a 40 mm thickness was cold rolled (processing rate: 30%) to a thickness of 28 mm to obtain a second rolled material. The second rolled material was maintained at a temperature of 410° C. for 20 hours for aging treatment to thereby obtain an aging-treated material. After the aging treatment, the aging-treated material was quenched. Thereafter, the aging-treated material having a thickness of 28 mm was cold rolled (processing rate: 99%) to a thickness of 0.28 mm to thereby obtain a third rolled material as an intended Cu—Ag alloy plate material. The obtained Cu—Ag alloy plate material was subjected to characteristic evaluation to be described later.

Example 4

An alloy raw material containing 12% by mass of Ag with the remainder being composed of Cu and unavoidable impurities was put in a graphite crucible and dissolved. The resultant molten Cu—Ag alloy was casted into a graphite mold to produce a Cu—Ag alloy ingot. The surface of the Cu—Ag alloy was ground and removed to produce a Cu—Ag alloy billet having a size of 200 mm width, 230 mm length, and 50 mm thickness. Then, the obtained Cu—Ag alloy billet was cold rolled (processing rate: 20%) to a thickness of 40 mm to obtain a first rolled material. The first rolled material was then maintained at a temperature of 760° C. for 2 hours for solution treatment to thereby obtain a solution-treated material. After the solution treatment, the solution-treated material was quenched at a quenching rate of −700° C./min. Then, the solution-treated material having a 40 mm thickness was cold rolled (processing rate: 30%) to a thickness of 28 mm to obtain a second rolled material. The second rolled material was maintained at a temperature of 410° C. for 20 hours for aging treatment to thereby obtain an aging-treated material. After the aging treatment, the aging-treated material was quenched. Thereafter, the aging-treated material having a thickness of 28 mm was cold rolled (processing rate: 99%) to a thickness of 0.28 mm to thereby obtain a third rolled material as an intended Cu—Ag alloy plate material. The obtained Cu—Ag alloy plate material was subjected to characteristic evaluation to be described later.

Example 5

An alloy raw material containing 13% by mass of Ag with the remainder being composed of Cu and unavoidable impurities was put in a graphite crucible and dissolved. The resultant molten Cu—Ag alloy was casted into a graphite mold to produce a Cu—Ag alloy ingot. The surface of the Cu—Ag alloy was ground and removed to produce a Cu—Ag alloy billet having a size of 200 mm width, 230 mm length, and 50 mm thickness. Then, the obtained Cu—Ag alloy billet was cold rolled (processing rate: 20%) to a thickness of 40 mm to obtain a first rolled material. The first rolled material was then maintained at a temperature of 760° C. for 2 hours for solution treatment to thereby obtain a solution-treated material. After the solution treatment, the solution-treated material having a 40 mm thickness was cold rolled (processing rate: 30%) to a thickness of 28 mm to obtain a second rolled material. The second rolled material was maintained at a temperature of 410° C. for 20 hours for aging treatment to thereby obtain an aging-treated material. After the aging treatment, the aging-treated material having a thickness of 28 mm was cold rolled (processing rate: 99%) to a thickness of 0.28 mm to thereby obtain a third rolled material as an intended Cu—Ag alloy plate material. The obtained Cu—Ag alloy plate material was subjected to characteristic evaluation to be described later.

Comparative Example 1

An alloy raw material containing 4% by mass of Ag with the remainder being composed of Cu and unavoidable impurities was put in a graphite crucible and dissolved. The resultant molten Cu—Ag alloy was casted into a graphite mold to produce a Cu—Ag alloy ingot. The surface of the Cu—Ag alloy was ground and removed to produce a Cu—Ag alloy billet having a size of 200 mm width, 230 mm length, and 50 mm thickness. Then, the obtained Cu—Ag alloy billet was cold rolled (processing rate: 20%) to a thickness of 40 mm to obtain a first rolled material. The first rolled material was then maintained at a temperature of 760° C. for 2 hours for solution treatment to thereby obtain a solution-treated material. After the solution treatment, the solution-treated material was quenched at a quenching rate of −700° C./min. Then, the solution-treated material having a 40 mm thickness was cold rolled (processing rate: 30%) to a thickness of 28 mm to obtain a second rolled material. The second rolled material was maintained at a temperature of 410° C. for 20 hours for aging treatment to thereby obtain an aging-treated material. After the aging treatment, the aging-treated material was quenched. Thereafter, the aging-treated material having a thickness of 28 mm was cold rolled (processing rate: 99%) to a thickness of 0.28 mm to thereby obtain a third rolled material as an intended Cu—Ag alloy plate material. The obtained Cu—Ag alloy plate material was subjected to characteristic evaluation to be described later.

Reference Example 1

An alloy raw material containing 6% by mass of Ag with the remainder being composed of Cu and unavoidable impurities was put in a graphite crucible and dissolved. The resultant molten Cu—Ag alloy was casted into a graphite mold to produce a Cu—Ag alloy ingot. The surface of the Cu—Ag alloy was ground and removed to produce a Cu—Ag alloy billet having a size of 200 mm width, 230 mm length, and 40 mm thickness. Then, the obtained Cu—Ag alloy billet was maintained at a temperature of 760° C. for 2 hours for solution treatment to thereby obtain a solution-treated material. Then, the solution-treated material having a 40 mm thickness was cold rolled (processing rate: 30%) to a thickness of 28 mm to obtain a second rolled material. The second rolled material was maintained at a temperature of 410° C. for 20 hours for aging treatment to thereby obtain an aging-treated material. Thereafter, the aging-treated material having a thickness of 28 mm was cold rolled (processing rate: 99%) to a thickness of 0.28 mm to thereby obtain a third rolled material as an intended Cu—Ag alloy plate material. The obtained Cu—Ag alloy plate material was subjected to characteristic evaluation to be described later.

Reference Example 2

An alloy raw material containing 6% by mass of Ag with the remainder being composed of Cu and unavoidable impurities was put in a graphite crucible and dissolved. The resultant molten Cu—Ag alloy was casted into a graphite mold to produce a Cu—Ag alloy ingot. The surface of the Cu—Ag alloy was ground and removed to produce a Cu—Ag alloy billet having a size of 200 mm width, 230 mm length, and 50 mm thickness. Then, the obtained Cu—Ag alloy billet was cold rolled (processing rate: 20%) to a thickness of 40 mm to obtain a first rolled material. The first rolled material was then maintained at a temperature of 760° C. for 2 hours for solution treatment to thereby obtain a solution-treated material. Then, the solution-treated material having a 40 mm thickness was cold rolled (processing rate: 30%) to a thickness of 28 mm to obtain a second rolled material. The second rolled material was maintained at a temperature of 550° C. for 0.5 hours for aging treatment to thereby obtain an aging-treated material. Thereafter, the aging-treated material having a thickness of 28 mm was cold rolled (processing rate: 99%) to a thickness of 0.28 mm to thereby obtain a third rolled material as an intended Cu—Ag alloy plate material. The obtained Cu—Ag alloy plate material was subjected to characteristic evaluation to be described later.

Comparative Example 2

An alloy raw material containing 14% by mass of Ag with the remainder being composed of Cu and unavoidable impurities was put in a graphite crucible and dissolved. The resultant molten Cu—Ag alloy was casted into a graphite mold to produce a Cu—Ag alloy ingot. The surface of the Cu—Ag alloy was ground and removed to produce a Cu—Ag alloy billet having a size of 200 mm width, 230 mm length, and 50 mm thickness. Then, the obtained Cu—Ag alloy billet was cold rolled (processing rate: 20%) to a thickness of 40 mm to obtain a first rolled material. The first rolled material was then maintained at a temperature of 760° C. for 2 hours for solution treatment to thereby obtain a solution-treated material. Then, the solution-treated material having a 40 mm thickness was cold rolled (processing rate: 30%) to a thickness of 28 mm to obtain a second rolled material. The second rolled material was maintained at a temperature of 410° C. for 20 hours for aging treatment to thereby obtain an aging-treated material. Thereafter, the aging-treated material having a thickness of 28 mm was cold rolled (processing rate: 99%) to a thickness of 0.28 mm. However, cracks and the like occurred during rolling, failing to obtain an intended third rolled material having a 0.28 mm thickness.

Comparative Example 3

An alloy raw material containing 14% by mass of Ag with the remainder being composed of Cu and unavoidable impurities was put in a graphite crucible and dissolved. The resultant molten Cu—Ag alloy was casted into a graphite mold to produce a Cu—Ag alloy ingot. The surface of the Cu—Ag alloy was ground and removed to produce a Cu—Ag alloy billet having a size of 200 mm width, 230 mm length, and 50 mm thickness. Then, the obtained Cu—Ag alloy billet was cold rolled (processing rate: 20%) to a thickness of 40 mm to obtain a first rolled material. The first rolled material was then maintained at a temperature of 760° C. for 2 hours for solution treatment to thereby obtain a solution-treated material. Then, the solution-treated material having a 40 mm thickness was cold rolled (processing rate: 30%) to a thickness of 28 mm to obtain a second rolled material. The second rolled material was maintained at a temperature of 550° C. for 0.5 hours for aging treatment to thereby obtain an aging-treated material. Thereafter, the aging-treated material having a thickness of 28 mm was cold rolled (processing rate: 99%) to a thickness of 0.28 mm to thereby obtain a third rolled material as an intended Cu—Ag alloy plate material. The obtained Cu—Ag alloy plate material was subjected to characteristic evaluation to be described later. However, a large number of cracks occurred in the obtained Cu—Ag alloy plate material.

Comparative Example 4

An alloy raw material containing 24% by mass of Ag with the remainder being composed of Cu and unavoidable impurities was put in a graphite crucible and dissolved. The resultant molten Cu—Ag alloy was casted into a graphite mold to produce a Cu—Ag alloy ingot. The surface of the Cu—Ag alloy was ground and removed to produce a Cu—Ag alloy billet having a size of 200 mm width, 230 mm length, and 50 mm thickness. Then, the obtained Cu—Ag alloy billet was cold rolled (processing rate: 20%) to a thickness of 40 mm to obtain a first rolled material. The first rolled material was then maintained at a temperature of 760° C. for 2 hours for solution treatment to thereby obtain a solution-treated material. Then, the solution-treated material having a 40 mm thickness was cold rolled (processing rate: 30%) to a thickness of 28 mm to obtain a second rolled material. The second rolled material was maintained at a temperature of 410° C. for 20 hours for aging treatment to thereby obtain an aging-treated material. Thereafter, the aging-treated material having a thickness of 28 mm was cold rolled (processing rate: 99%) to a thickness of 0.28 mm. However, cracks and the like occurred during rolling, failing to obtain an intended third rolled material having a 0.28 mm thickness.

Comparative Example 5

An alloy raw material containing 24% by mass of Ag with the remainder being composed of Cu and unavoidable impurities was put in a graphite crucible and dissolved. The resultant molten Cu—Ag alloy was casted into a graphite mold to produce a Cu—Ag alloy ingot. The surface of the Cu—Ag alloy was ground and removed to produce a Cu—Ag alloy billet having a size of 200 mm width, 230 mm length, and 40 mm thickness. Then, the obtained Cu—Ag alloy billet was maintained at a temperature of 760° C. for 2 hours for solution treatment to thereby obtain a solution-treated material. Then, the solution-treated material having a 40 mm thickness was cold rolled (processing rate: 30%) to a thickness of 28 mm to obtain a second rolled material. The second rolled material was maintained at a temperature of 410° C. for 20 hours for aging treatment to thereby obtain an aging-treated material. Thereafter, the aging-treated material having a thickness of 28 mm was cold rolled (processing rate: 99%) to a thickness of 0.28 mm. However, cracks and the like occurred during rolling, failing to obtain an intended third rolled material having a 0.28 mm thickness.

Comparative Example 6

An alloy raw material containing 24% by mass of Ag with the remainder being composed of Cu and unavoidable impurities was put in a graphite crucible and dissolved. The resultant molten Cu—Ag alloy was casted into a graphite mold to produce a Cu—Ag alloy ingot. The surface of the Cu—Ag alloy was ground and removed to produce a Cu—Ag alloy billet having a size of 200 mm width, 230 mm length, and 50 mm thickness. Then, the obtained Cu—Ag alloy billet was cold rolled (processing rate: 20%) to a thickness of 40 mm to obtain a first rolled material. The first rolled material was then maintained at a temperature of 760° C. for 2 hours for solution treatment to thereby obtain a solution-treated material. Then, the solution-treated material having a 40 mm thickness was cold rolled (processing rate: 30%) to a thickness of 28 mm to obtain a second rolled material. The second rolled material was maintained at a temperature of 550° C. for 0.5 hours for aging treatment to thereby obtain an aging-treated material. Thereafter, the aging-treated material having a thickness of 28 mm was cold rolled (processing rate: 99%) to a thickness of 0.28 mm to thereby obtain a third rolled material as an intended Cu—Ag alloy plate material. The obtained Cu—Ag alloy plate material was subjected to characteristic evaluation to be described later. However, a large number of cracks occurred in the obtained Cu—Ag alloy plate material.

XRD measurement was performed, according to the above-described method, for the Cu—Ag alloy plate materials obtained in Examples 1 to 5, Reference Examples 1, 2, and Comparative Examples 1, 3, 6 to obtain the peak strength ratio of the Ag (220) plane, peak strength ratio of the Ag (111) plane, peak strength ratio of the other planes of Ag, and peak strength ratio of planes other than Ag (220) plane. The XRD measurement was conducted using an X-ray diffraction device Smartlab (product name) manufactured by Rigaku Corporation. XRD measurement results are shown in Table 1. The peak strength ratio of the other planes of Ag, and peak strength ratio of planes other than Ag (220) plane were obtained according to the above-described measurement method for the peak strength ratio of the Ag (220) plane and Ag (111) plane.

TABLE 1

| | XRD measurement result (Ag orientation plane) [%] | | | |
|---|---|---|---|---|
| | Strength ratio of (220) | Strength ratio of (111) | Strength ratio of other planes | Strength ratio of planes other than (220) |
| Example 1 | 99 | 1 | 0 | 1 |
| Example 2 | 98 | 2 | 0 | 2 |
| Example 3 | 96 | 4 | 0 | 4 |
| Example 4 | 92 | 5 | 3 | 8 |
| Example 5 | 83 | 7 | 10 | 17 |
| Comp Ex 1 | 100 | 0 | 0 | 0 |
| Reference Ex 1 | 72 | 24 | 4 | 28 |
| Reference Ex 2 | 62 | 29 | 9 | 38 |
| Comp Ex 2 | | Unable to be processed | | |
| Comp Ex 3 | 68 | 27 | 5 | 32 |
| Comp Ex 4 | | Unable to be processed | | |
| Comp Ex 5 | | Unable to be processed | | |
| Comp Ex 6 | 54 | 38 | 8 | 46 |

Then, observation and evaluation of a metal structure were performed, according to the above-described method, for the Cu—Ag alloy plate materials obtained in Examples 1 to 5, Reference Examples 1, 2, and Comparative Examples 1, 3, 6 listed above. As evaluation values, the concentration (in area ratio) of the thin Ag fibers, the average value thereof, and a variation therein, the concentration (in area ratio) of the thick Ag fibers, the average value thereof, and a variation therein, and the ratio of the concentration (average value in area ratio: C1) of the thin Ag fibers to the concentration (average value in area ratio: C2) of the thick Ag fibers are shown in Table 2. As shown in Table 2, in the Cu—Ag alloy plate materials of Examples 1 to 5, Ag fibers having an adequate shape and amount exit, while in the Cu—Ag alloy plate material of Comparative Example 1, the content of Ag is small, so that the precipitation amount of the Ag fibers is small. In the Cu—Ag alloy plate material of Reference Example 1, the solution treatment is not sufficiently completed due to omission of the cold rolling after casting, so that the Ag fibers are not sufficiently precipitated. In the Cu—Ag alloy plate material of Reference Example 2, Ag fibers having an adequate shape and amount are not precipitated due to setting of high temperature as the aging treatment condition. In the Cu—Ag alloy plate materials of Comparative Examples 3 and 6, Ag fibers having an adequate shape and amount are not precipitated due to excessive existence of Ag.

TABLE 2

| | Concentration of Ag fiber (area ratio) | | | | | | |
|---|---|---|---|---|---|---|---|
| | Thin fiber [area ratio: %] | | | Thick fiber [Area ratio: %] | | | |
| | Concentration | Average concentration value C1 | Concentration variation | Concentration | Average concentration value C2 | Concentration variation | C1/C2 ratio |
| Ex 1 | 1.67-2.86 | 2.27 | 1.19 | 0 | 0 | — | — |
| Ex 2 | 4.43-5.36 | 4.90 | 0.93 | 3.12-3.82 | 3.47 | 0.7 | 1.4 |
| Ex 3 | 5.14-5.91 | 5.53 | 0.77 | 4.09-4.86 | 4.48 | 0.77 | 1.2 |
| Ex 4 | 5.84-6.65 | 6.25 | 0.81 | 5.31-5.23 | 5.77 | 0.92 | 1.1 |
| Ex 5 | 5.92-6.78 | 6.30 | 0.86 | 5.35-6.00 | 5.82 | 0.95 | 0.9 |
| Comp 1 | 0.72-1.50 | 1.11 | 0.78 | 0.42-0.62 | 0.52 | 0.20 | 2.1 |
| Ref ex 1 | 1.04-2.02 | 1.53 | 0.98 | 0.53-0.74 | 0.64 | 0.21 | 2.4 |
| Ref ex 2 | 0.12-0.35 | 0.24 | 0.23 | 1.3-2.2 | 1.75 | 0.90 | 0.1 |
| Comp 2 | | | | Unable to be processed | | | |
| Comp 3 | 0.62-1.34 | 0.98 | 0.72 | 9.24-10.73 | 9.99 | 1.49 | 0.1 |
| Comp 4 | | | | Unable to be processed | | | |
| Comp 5 | | | | Unable to be processed | | | |
| Comp 6 | 0.36-7.02 | 3.69 | 6.66 | 16.98-23.64 | 20.31 | 6.66 | 0.2 |

Then, the conductivity (% IACS), tensile strength (UTS) in the rolling direction, and tensile strength (UTS) in a direction perpendicular to the rolling direction were measured, according to the above-described method, for the Cu—Ag alloy plate materials obtained in Examples 1 to 5, Reference Examples 1, 2, and Comparative Examples 1, 3, 6 listed above. The measurement results are shown in Table 3. As is clear from Table 3, in the Cu—Ag alloy plate materials of Examples 1 to 4, the conductivity (% IACS), tensile strength (UTS) in the rolling direction, and tensile strength (UTS) in a direction perpendicular to the rolling direction are all excellent.

TABLE 3

|  | Conductivity [% IACS] | Tensile strength (UTS) [MPa] | |
|---|---|---|---|
|  |  | Rolling direction | Direction perpendicular to rolling direction |
| Example 1 | 68.8 | 1055 | 1170 |
| Example 2 | 64.5 | 1070 | 1200 |
| Example 3 | 67.0 | 1100 | 1250 |
| Example 4 | 66.3 | 1090 | 1230 |
| Example 5 | 65.0 | 1050 | 1160 |
| Comp Example 1 | 68.0 | 700 | 850 |
| Ref Example 1 | 68.0 | 850 | 970 |
| Ref Example 2 | 68.0 | 830 | 950 |
| Comp Example 2 |  | Unable to be processed |  |
| Comp Example 3 | 69.0 | 650 | 850 |
| Comp Example 4 |  | Unable to be processed |  |
| Comp Example 5 |  | Unable to be processed |  |
| Comp Example 6 | 60.0 | 1000 | 1100 |

Examples 6 to 9

For each of Examples 6 to 9, an alloy raw material containing Ag in an amount shown in Table 4 with the remainder being composed of Cu and unavoidable impurities was put in a graphite crucible and dissolved. The resultant molten Cu—Ag alloy was casted into a graphite mold to produce a Cu—Ag alloy ingot. The surface of the Cu—Ag alloy was ground and removed to produce a Cu—Ag alloy billet having a size of 200 mm width, 230 mm length, and 50 mm thickness. Then, the obtained Cu—Ag alloy billet was cold rolled at a processing rate shown in Table 4 to obtain a first rolled material. The first rolled material was solution treated under the condition shown in Table 4 to obtain a solution-treated material. After the solution treatment, the solution-treated material was quenched at a quenching rate of −700° C./min. Then, the solution-treated material was cold rolled at a processing rate shown in Table 4 to obtain a second rolled material. The second rolled material was aging treated under the condition shown in Table 4 to obtain an aging-treated material. After the aging treatment, the aging-treated material was quenched. Thereafter, the aging-treated material was cold rolled at a processing rate shown in Table 4 to thereby obtain a third rolled material as an intended Cu—Ag alloy plate material. The obtained Cu—Ag alloy plate material was subjected to the XRD measurement, conductivity measurement, and tensile strength (UTS) measurement in the same manner as in Example 1. The measurement results are shown in Table 5. In the XRD measurement, the peak strength ratio of the Ag (311) plane was obtained. As the tensile strength (UTS), the tensile strength (UTS) in the rolling direction and that in a direction perpendicular to the rolling direction were obtained.

TABLE 4

|  | Alloy composition [mass %] | | Manufacturing conditions | | | | |
|---|---|---|---|---|---|---|---|
|  |  |  | First rolling Rolling reduction | Solution treatment Temp [° C.] × | Second rolling Rolling reduction | Aging treatment Temp [° C.] × | Third rolling Rolling reduction |
|  | Ag | Cu | [%] | Time [h] | [%] | Time [h] | [%] |
| Example 6 | 7 | Remainder | 20 | 760 × 2 | 30 | 410 × 20 | 99 |
| Example 7 | 9 | Remainder | 20 | 760 × 2 | 30 | 410 × 20 | 99 |
| Example 8 | 11 | Remainder | 20 | 760 × 2 | 30 | 410 × 20 | 99 |
| Example 9 | 13 | Remainder | 20 | 760 × 2 | 30 | 410 × 20 | 99 |

TABLE 5

|  | XRD measurement result Strength ratio [%] of Ag (311) plane | Conductivity [% IACS] | Tensile strength (UTS) [MPa] | | | | |
|---|---|---|---|---|---|---|---|
|  |  |  | Rolling direction | | | | Direction perpendicular to rolling direction |
|  |  |  |  | Variation | | |  |
|  |  |  | Minimum value | Maximum Value | Average value |  |  |
| Example 6 | 0 | 68.8 | 1127 | 1127 | 1145 | 1135 | 1232 |
| Example 7 | 0 | 67.5 | 1114 | 1114 | 1129 | 1122 | 1201 |
| Example 8 | 0 | 66.8 | 1125 | 1125 | 1146 | 1136 | 1228 |
| Example 9 | 0 | 67.0 | 1124 | 1124 | 1146 | 1135 | 1219 |

Examples 10 to 31, Comparative Examples 7 to 9

Figure 2:
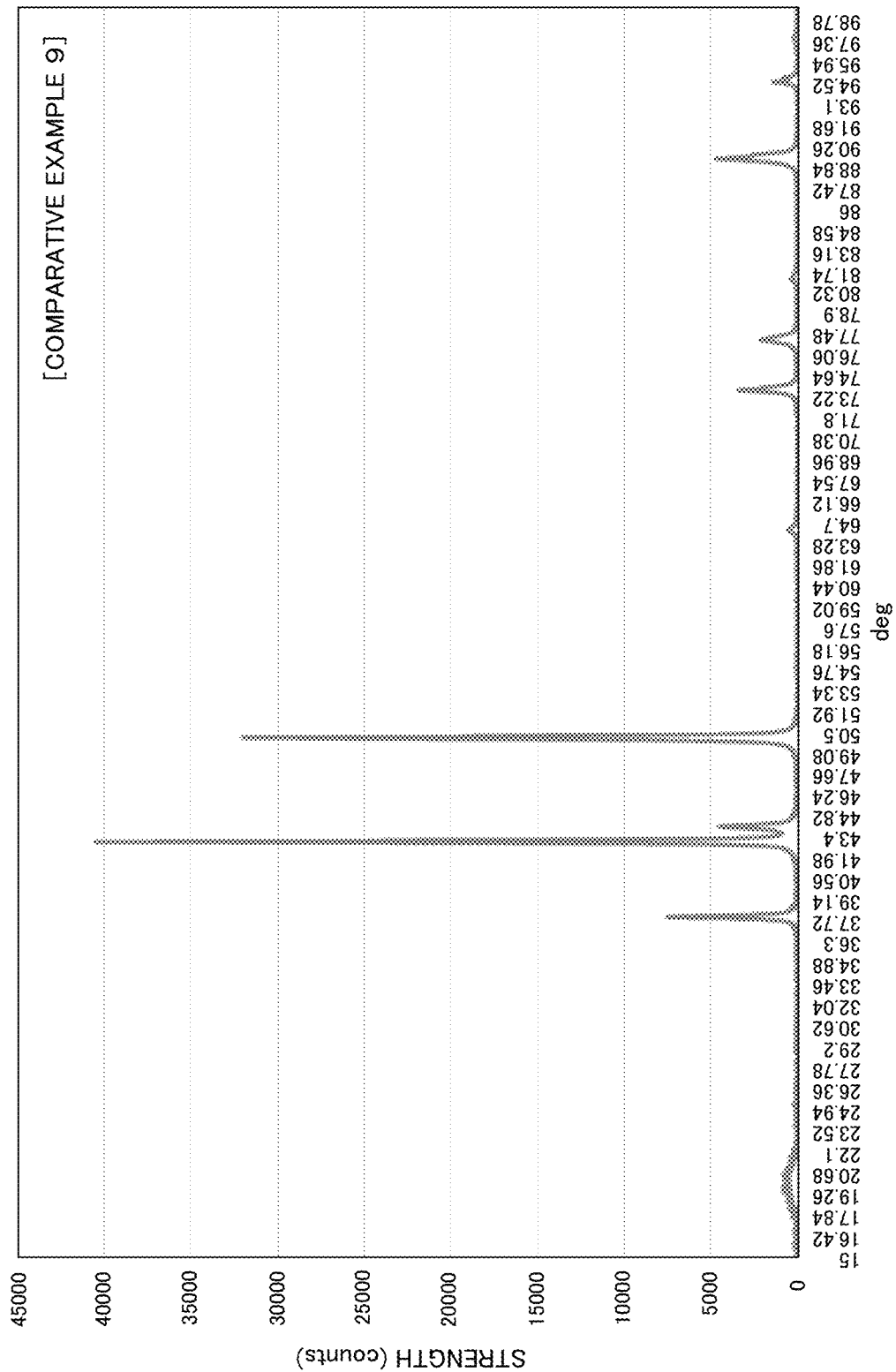
FIG. 2 is an X-ray diffraction profile of a copper alloy plate material of Comparative Example 9.

For each of Examples 10 to 31 and Comparative Examples 7 to 9, an alloy raw material containing Ag in an amount shown in Table 6 with the remainder being composed of Cu and unavoidable impurities was put in a graphite crucible and dissolved. The resultant molten Cu—Ag alloy was casted into a graphite mold to produce a Cu—Ag alloy ingot. The surface of the Cu—Ag alloy was ground and removed to produce a Cu—Ag alloy billet having a size of 200 mm width, 230 mm length, and 50 mm thickness. Then, the obtained Cu—Ag alloy billet was cold rolled at a processing rate shown in Table 6 to obtain a first rolled material. The first rolled material was solution treated under the condition shown in Table 6 to obtain a solution-treated material. After the solution treatment, the solution-treated material was quenched at a quenching rate of –700° C./min. Then, the solution-treated material was cold rolled at a processing rate shown in Table 6 to obtain a second rolled material. The second rolled material was aging treated under the condition shown in Table 6 to obtain an aging-treated material. After the aging treatment, the aging-treated material was quenched. Thereafter, the aging-treated material was cold rolled at a processing rate shown in Table 6 to thereby obtain a third rolled material as an intended Cu—Ag alloy plate material. The obtained Cu—Ag alloy plate material was subjected to the XRD measurement, conductivity measurement, and tensile strength (UTS) measurement in the same manner as in Example 1. The measurement results are shown in Table 7. In the XRD measurement, the peak strength ratio of the Ag (311) plane was obtained. An XRD profile of the Cu—Ag alloy plate material of Example 29 is illustrated in FIG. 1, and an XRD profile of the copper alloy plate material of Comparative Example 9 is illustrated in FIG. 2. As the tensile strength (UTS), the tensile strength (UTS) in the rolling direction and that in a direction perpendicular to the rolling direction were obtained.

TABLE 6

| | Alloy composition [mass %] | | Manufacturing conditions | | | | |
|---|---|---|---|---|---|---|---|
| | | | First rolling Rolling reduction | Solution treatment Temp [° C.] × Time [h] | Second rolling Rolling reduction | Aging treatment Temp [° C.] × Time [h] | Third rolling Rolling reduction |
| | Ag | Cu | [%] | | [%] | | [%] |
| Example 10 | 4 | Remainder | 20 | 760 × 2 | 93 | 410 × 20 | 95 |
| Example 11 | 6 | Remainder | 20 | 760 × 2 | 93 | 410 × 20 | 95 |
| Example 12 | 7 | Remainder | 20 | 760 × 2 | 93 | 410 × 20 | 90 |
| Example 13 | 7 | Remainder | 20 | 760 × 3 | 98 | 410 × 20 | 90 |
| Example 14 | 7 | Remainder | 20 | 760 × 2 | 30 | 250 × 48 | 99 |
| Example 15 | 7 | Remainder | 20 | 760 × 2 | 93 | 250 × 48 | 90 |
| Example 16 | 7 | Remainder | 20 | 760 × 3 | 98 | 250 × 48 | 90 |
| Example 17 | 9 | Remainder | 20 | 760 × 2 | 93 | 410 × 20 | 90 |
| Example 18 | 9 | Remainder | 20 | 760 × 2 | 30 | 250 × 48 | 99 |
| Example 19 | 9 | Remainder | 20 | 760 × 2 | 93 | 250 × 48 | 90 |
| Example 20 | 9 | Remainder | 20 | 760 × 3 | 98 | 250 × 48 | 90 |
| Example 21 | 10 | Remainder | 20 | 760 × 2 | 93 | 410 × 20 | 95 |
| Example 22 | 11 | Remainder | 20 | 760 × 2 | 93 | 410 × 20 | 90 |
| Example 23 | 11 | Remainder | 20 | 760 × 3 | 98 | 410 × 20 | 90 |
| Example 24 | 11 | Remainder | 20 | 760 × 2 | 30 | 250 × 48 | 99 |
| Example 25 | 11 | Remainder | 20 | 760 × 2 | 93 | 250 × 48 | 90 |
| Example 26 | 11 | Remainder | 20 | 760 × 3 | 98 | 250 × 48 | 90 |
| Example 27 | 13 | Remainder | 20 | 760 × 2 | 93 | 410 × 20 | 90 |
| Example 28 | 13 | Remainder | 20 | 760 × 3 | 98 | 410 × 20 | 90 |
| Example 29 | 13 | Remainder | 20 | 760 × 2 | 30 | 250 × 48 | 99 |
| Example 30 | 13 | Remainder | 20 | 760 × 2 | 93 | 250 × 48 | 90 |
| Example 31 | 13 | Remainder | 20 | 760 × 3 | 98 | 250 × 48 | 90 |
| Comp Ex 7 | 7 | Remainder | 20 | 760 × 2 | 93 | 700 × 20 | 90 |
| Comp Ex 8 | 9 | Remainder | 20 | 760 × 2 | 93 | 700 × 20 | 90 |
| Comp Ex 9 | 11 | Remainder | 20 | 760 × 2 | 93 | 700 × 20 | 90 |

TABLE 7

| | XRD measuremert result Strength ratio [%] of Ag (311) plane | Conductivity [% IACS] | Tensile strength (UTS) [MPa] | | | | Direction perpendicular to rolling direction |
|---|---|---|---|---|---|---|---|
| | | | Rolling direction | | | | |
| | | | | Variation | | | |
| | | | Mininium value | Maximum Value | Average value | | |
| Example 10 | 0 | 86.0 | 630 | 630 | 660 | 645 | 700 |
| Example 11 | 0 | 83.0 | 750 | 750 | 765 | 758 | 750 |
| Example 12 | 6 | 86.5 | 700 | 700 | 717 | 708 | 800 |
| Example 13 | 17 | 88.3 | 630 | 630 | 648 | 639 | 730 |
| Example 14 | 0 | 70.9 | 948 | 948 | 964 | 956 | 1037 |
| Example 15 | 0 | 70.6 | 960 | 960 | 980 | 970 | 1058 |

TABLE 7-continued

| | XRD measurement result Strength ratio [%] of Ag (311) plane | Conductivity [% IACS] | Tensile strength (UTS) [MPa] | | | | Direction perpendicular to rolling direction |
|---|---|---|---|---|---|---|---|
| | | | Rolling direction | | | | |
| | | | | Variation | | | |
| | | | Mininium value | Minimum value | Maximum Value | Average value | |
| Example 16 | 0 | 73.7 | 917 | 917 | 936 | 927 | 1008 |
| Example 17 | 8 | 85.4 | 729 | 729 | 741 | 735 | 831 |
| Example 18 | 0 | 64.8 | 947 | 947 | 963 | 955 | 1035 |
| Example 19 | 0 | 69.2 | 996 | 996 | 1012 | 1004 | 1085 |
| Example 20 | 0 | 71.0 | 918 | 918 | 932 | 925 | 1022 |
| Example 21 | 0 | 82.0 | 850 | 850 | 868 | 859 | 850 |
| Example 22 | 11 | 83.7 | 715 | 715 | 734 | 725 | 821 |
| Example 23 | 8 | 86.8 | 687 | 687 | 701 | 694 | 792 |
| Example 24 | 0 | 69.9 | 956 | 956 | 974 | 965 | 1043 |
| Example 25 | 5 | 69.4 | 963 | 963 | 982 | 973 | 1056 |
| Example 26 | 6 | 71.8 | 955 | 955 | 971 | 963 | 1035 |
| Example 27 | 8 | 84.6 | 726 | 726 | 741 | 734 | 826 |
| Example 28 | 8 | 85.2 | 689 | 689 | 702 | 695 | 778 |
| Example 29 | 0 | 63.9 | 947 | 947 | 962 | 955 | 1042 |
| Example 30 | 6 | 70.9 | 975 | 975 | 990 | 983 | 1078 |
| Example 31 | 8 | 71.7 | 956 | 956 | 973 | 964 | 1038 |
| Comp Ex 7 | 24 | 93.0 | 300 | 300 | 360 | 330 | 400 |
| Comp Ex 8 | 25 | 91.0 | 350 | 350 | 420 | 385 | 450 |
| Comp Ex 9 | 27 | 89.0 | 450 | 450 | 510 | 480 | 550 |

What is claimed is:

1. A high strength/highly conductive copper alloy plate material comprising silver in a range of 6% by mass or more and 13% by mass or less, and balancing copper and unavoidable impurities, wherein
a minimum value of a tensile strength (UTS) is 1000 MPa or more and 1250 MPa or less, and a conductivity (% IACS) is 60% or more and 90% or less; and
a peak strength ratio of a (220) plane of silver is 80% or more in a X-ray diffraction chart of the copper alloy plate material.

2. The plate material according to claim 1, wherein the silver is contained in a range of 8% by mass or more and 12% by mass or less.

3. The plate material according to claim 2 including a metal structure having fibers containing silver, wherein
the metal structure has thin fibers having a fiber diameter of 0.1 nm or more and 10 nm or less and thick fibers having a fiber diameter of 1 μm or more and 10 μm or less,
a concentration of the thin fibers in the metal structure is 4% or more and 7% or less in area ratio,
a concentration of the thick fibers in the metal structure is 3% or more and 6% or less in area ratio, and
a ratio of the concentration of the thin fibers in area ratio to the concentration of the thick fibers in area ratio is 0.9 or more.

4. The plate material according to claim 3, wherein the ratio of the concentration of the thin fibers in area ratio to the concentration of the thick fibers in area ratio is 2 or less.

5. The plate material according to claim 1, wherein the conductivity (% IACS) of the copper alloy plate material is 64% or more and 75% or less.

6. The plate material according to claim 1, wherein
a minimum value of a tensile strength (UTS) in a rolling direction of the copper alloy plate material is 1000 MPa or more and 1150 MPa or less, and
a minimum value of a tensile strength (UTS) in a direction perpendicular to the rolling direction is 1150 MPa or more and 1250 MPa or less.

7. The plate material according to claim 1, wherein
a peak strength ratio of a (111) plane of silver is 20% or less in the X-ray diffraction chart of the copper alloy plate material.

8. The plate material according to claim 1 including a metal structure having fibers containing silver, wherein
the metal structure has thin fibers having a fiber diameter of 0.1 nm or more and 10 nm or less, and
a concentration of the thin fibers in the metal structure is 4% or more and 7% or less in area ratio.

* * * * *